United States Patent [19]
Hobson

[11] Patent Number: 5,352,016
[45] Date of Patent: Oct. 4, 1994

[54] ADJUSTABLE BICYCLE SEAT

[76] Inventor: Richard S. Hobson, 13760 Oxnard St. Apt. #305, Van Nuys, Calif. 91401

[21] Appl. No.: 798,596

[22] Filed: Nov. 26, 1991

[51] Int. Cl.5 .............................................. B62J 1/00
[52] U.S. Cl. .................. 297/201; 297/215.13
[58] Field of Search ............................ 297/201, 215.13

[56] References Cited

U.S. PATENT DOCUMENTS

| 563,063 | 6/1896 | Pullman .............................. 297/201 |
| 593,331 | 11/1897 | Noirit . |
| 608,682 | 8/1898 | Jamieson . |
| 622,357 | 4/1899 | Hitchcock et al. . |
| 629,956 | 8/1899 | Craig . |
| 635,598 | 10/1899 | Rowe . |
| 4,877,286 | 10/1989 | Hobson et al. . |

FOREIGN PATENT DOCUMENTS

| 14766 | 7/1911 | Denmark ............................. 297/201 |
| 373620 | 5/1907 | France ................................. 297/201 |
| 6424 | of 1898 | United Kingdom . |
| 2380 | of 1901 | United Kingdom ................ 297/201 |

Primary Examiner—James R. Brittain
Attorney, Agent, or Firm—Friederichs Law Firm

[57] ABSTRACT

An adjustable bicycle seat in which the rider, while riding, may manually adjust the support platforms to either a broader base or a narrower base by simply shifting a knob to a position corresponding to the desired breath of base.

33 Claims, 4 Drawing Sheets

ADJUSTABLE BICYCLE SEAT

BACKGROUND OF THE INVENTION

The present invention relates to bicycles, and more particularly, to adjustable bicycle seats.

Bicycles have a long history filled with inventions of various sorts. Early bicycles found the rider perched high in the air balancing on a very small seat. The early bicycle had a large front wheel and a very small rear wheel. As the bicycle evolved, its overall shape and conformation changed. Eventually, both the front wheel and the rear wheel were of the same size.

In like manner, the bicycle seat itself has evolved. While the very early bicycle seat was small and uncomfortable, later bicycle seats provided a broad base. However, the broad-base seats were clumsy in use. Past bicycle seats often included a pair of spiral springs that would absorb the shock. These seats with springs were not entirely safe due to the fact that the rider would tend to bounce when going over a bump on the riding surface.

A number of years ago, bicycle racing came into vogue, demanding changes in the bicycle seat for competitive purposes. The bicycle seat became streamlined in contrast to the broad, clumsy earlier structure. The streamlined seat, however, was again uncomfortable, and the bicycle rider had to be persistent in acclimating to the feel of the seat. Thus, the rider had a choice of the broad, clumsy seat which was comfortable, or the narrow, streamline seat which had little comfort.

In recent years, bicycling has become a national phenomena. Individuals of all ages take part in various bicycle treks from a few miles to hundreds of miles. Some engage in bicycling as a form of exercise, while others simply enjoy a leisure ride. Along with the increased demand for well-made bicycles came a demand for comfortable and streamlined bicycle seats. Adjustable seats were made which allowed the breadth of the seat to be adjusted. The rider could choose whether a broad seat or a streamlined seat was desired. Past adjustable seats formed the ideal combination between breadth of support and streamline characteristics desired in the industry. However, past adjustable seats were inconvenient because the rider had to stop to adjust the seat. The present invention solves this dilemma and allows the rider to adjust the seat while riding the bicycle. A simple shift of a knob changes the breadth of the base.

SUMMARY OF THE INVENTION

The bicycle seat of the present invention has a pair of platforms, one being provided for each of the buttocks of the rider. The two platforms are pivotally mounted with respect to each other at a forward point. The two platforms are supported on an adjustable plate which provides for easy adjustment.

Past inventions have already proposed an adjustable bicycle seat with two platforms. The problem, however, with prior inventions of this type is that a rider must stop and use a tool to adjust the platforms. This procedure takes time which many riders do not wish to waste.

The present invention poses an arrangement in which the rider may adjust the platforms while riding. No additional tools are needed to adjust the seat from one position to another. Rather, the rider may simply reach behind the seat and shift the knob to provide the desired breadth of base. Thus, the present invention makes the adjustment simple and allows riders to spend their precious time doing more enjoyable activities.

DETAILED DESCRIPTION OF THE PREFERRED EMBODIMENTS

Figure 1:
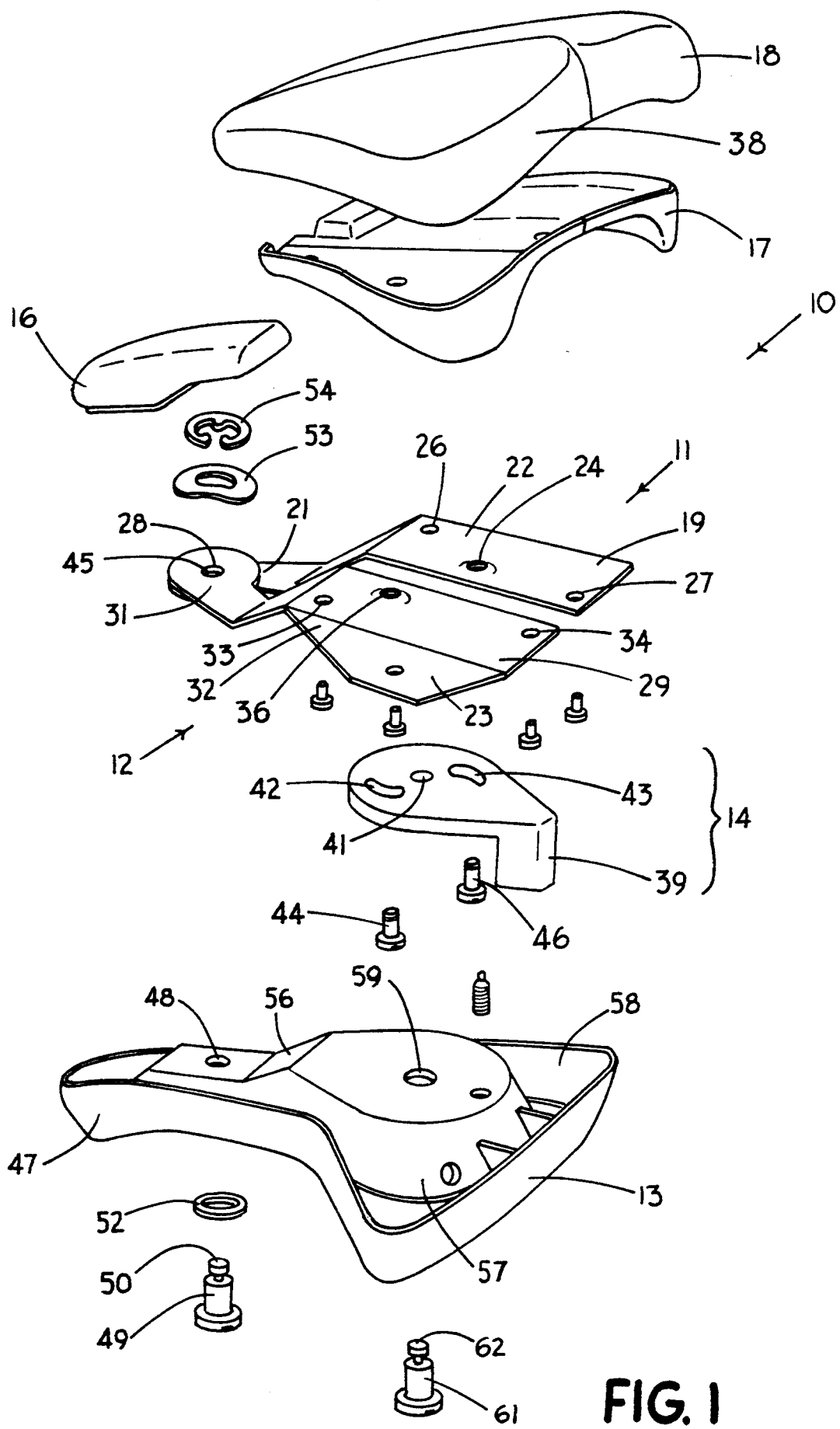
FIG. 1 is an exploded perspective view of the present invention.

As FIG. 1 illustrates, the bicycle seat 10 of the present invention has a right platform 11, a left platform 12, a base 13, an adjustable plate 14, and an upper horn portion 16.

The right platform 11 includes an underlying frame 17 and a cushion portion 18. The frame 17 includes a blade 19 and an integral attachment ring 21. The blade 19 may include an upwardly extending strengthening rib 22 and a downwardly extending strengthening rib (hidden). The upwardly extending strengthening rib 22 has defined a threaded opening 24 therein toward the lower left end for purposes hereinafter described. The blade 19 may define a plurality of open areas such as 26 and 27 for molding purposes.

The attachment ring 21 has defined an opening 28 in the center thereof for purposes hereinafter described. The attachment ring 21 is positioned offset downwardly from the blade 19 for purposes hereinafter described.

The cushion 18 serves to enclose the upper surface of the underlying frame 17 and may be constructed of a gel-like padding with a smooth outer skin of a polymeric material. The cushion 18 is molded over the blade 19. The cushion 18 is secured in place by the outer skin flowing around the frame 17 and through such openings as 26 and 27. The overall shape of the cushion 18 of the blade 19 may be generally semicircular.

The left platform 12 may be constructed substantially identical to the right platform 11 except the left platform 12 is the mirror image of the right platform 11. Attachment ring 31, however, is not offset as far downwardly with respect to blade 29 as the attachment ring 21 is offset with respect to blade 19. This provides the upper surface of left platform 12 on the same horizontal plane as right platform 11. In other words, left platform 12 has a blade 29 for example with a downwardly extending strengthening rib 23 and an upwardly extending strengthening rib 32 and may have a plurality of openings 33 and 34. The upwardly extending strengthening rib 32 has a threaded opening 36 defined therein towards the right upper end for purposes hereinafter described. The cushion 38 may likewise be constructed very similar to cushion 18 except being in a mirror image.

The adjustable plate 14 includes a hand knob 39. The adjustable plate has also defined a pivotal opening 41, and two elongated arc-shaped openings 42, 43. The elongated arc-shaped openings 42, 43 allow for inward and outward movement between the right platform 11 and the left platform 12. Screw 44 extends upwardly through the elongated opening 42 in the adjustable plate 14 and suitably mates with the threaded opening 36 in the left platform 12. A second screw 46 attaches similarly to the threaded opening 24 in the right platform 11. The elongated arc-shaped openings 42, 43 shift around the screws 44, 46, which move the platforms inward and outward from the center with respect to each other.

The lower horn portion 47 is integral with the base 13. The base 13 has defined therein an opening 48 in the lower horn portion 47. Horn shaft 49 extends upwardly through opening 48 in the lower horn portion 47, opening 28 in ring 21, opening 45 in ring 31, and suitably mates with horn screw 50. Washers such as 52, 53 and 54 may be placed around screw 49 to secure the various parts together. The base 13 incorporates a plurality of upwardly and downwardly facing grooves 56, 57 and 58 to accommodate the shapes of the right platform 11 and the left platform 12. An opening 59 is defined in the center of the base 13. Pivotal shaft 61 extends upwardly through pivotal opening 41 in plate 14, and suitably mates with pivotal screw 62. The adjustable plate 14 pivots around pivotal shaft 61.

Figure 2:
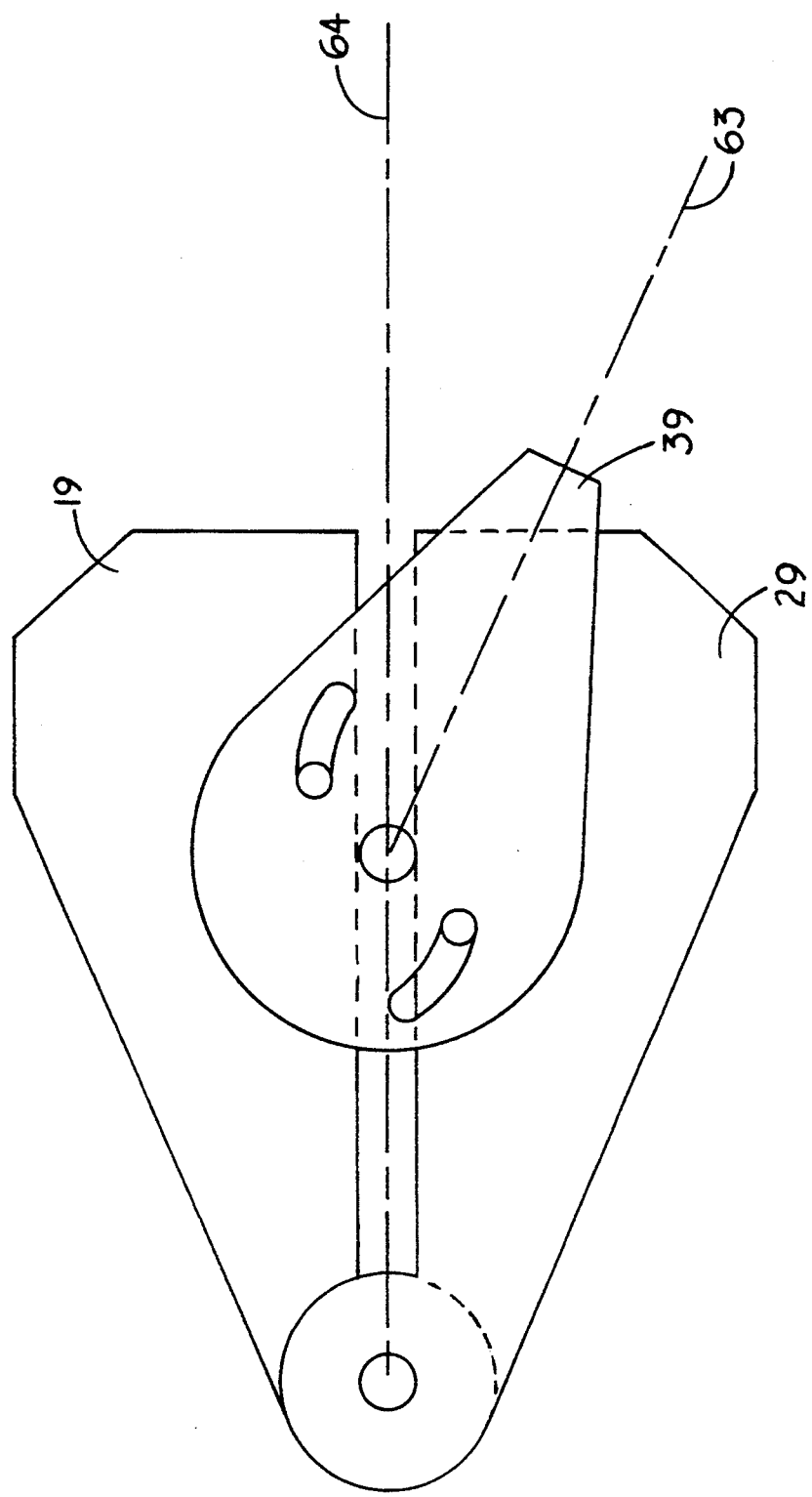
FIG. 2 is a sectional top view showing the platforms in the closed position.
Figure 3:
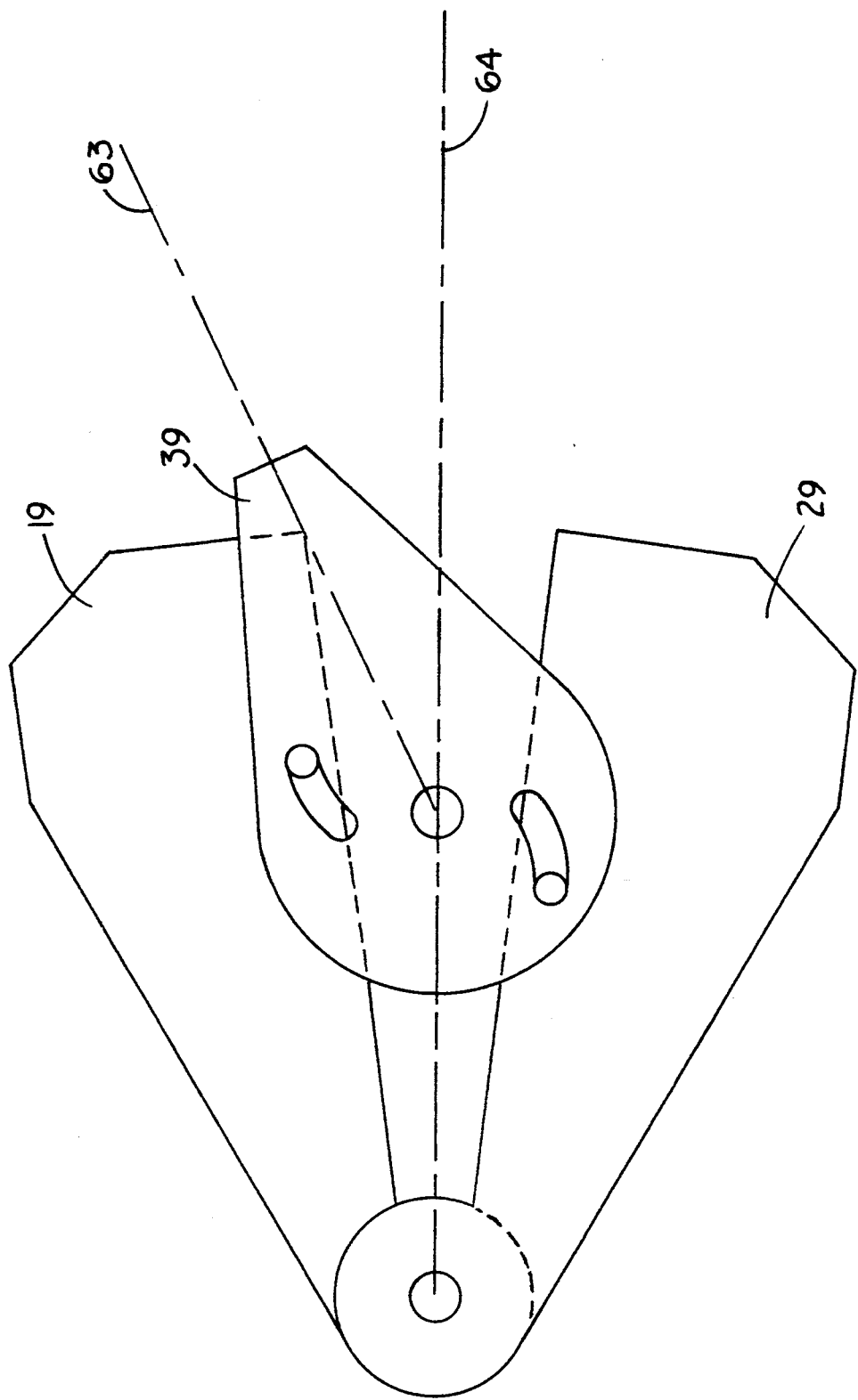
FIG. 3 is a sectional top view showing the platforms in the open position.
Figure 4:
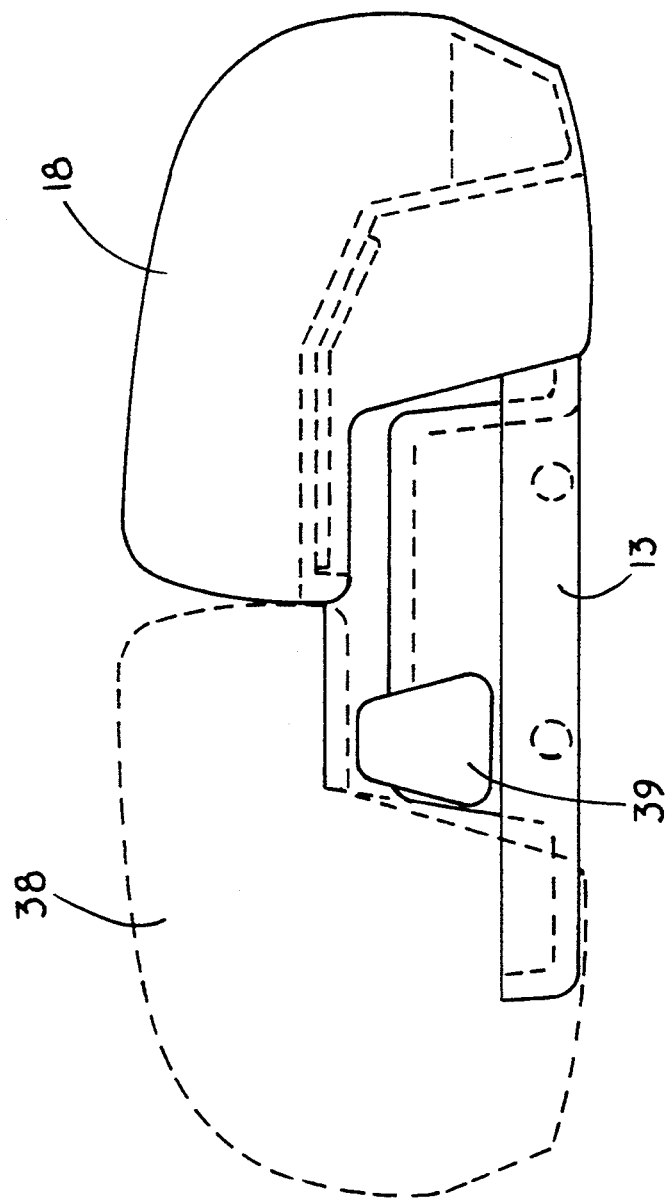
FIG. 4 is a rear view showing the knob in the closed position.

FIGS. 2 and 3 illustrate the rider selected angular positions. The angle between the two rider support platforms range from approximately 4.0 degrees to 18.0 degrees. Positioning the hand knob 39 to the far left forms a 25 degree angle between a longitudinal axis of the adjustment plate 63 and a longitudinal axis of the bicycle seat 64. Lastly, positioning the hand knob 39 to the far right forms a 25 degree angle between the longitudinal axis of the adjustment plate 63 and the longitudinal axis of the bicycle seat 64. FIG. 4 illustrates a rear view of the bicycle seat 10 with the hand knob 39 located far to the left in a closed position.

Operation of the Invention

Although the assembly and operation of the invention is apparent from the aforedescription, a further description is set forth in detail hereinafter in order to provide a more complete understanding of the invention. As shown in FIG. 1, the horn shaft 49 first extends through opening 48 in the base 13. This horn shaft 49 further extends through opening 28 in attachment ring 21, opening 45 in attachment ring 31, and suitably mates with horn screw 50 to lock all parts into place. The upper horn portion 16 attaches to the top of horn screw 50.

Towards the center of base 13, pivotal shaft 61 first extends through opening 59. Then, the pivotal shaft 61 extends upwardly through opening 41 in the adjustable plate 14 and suitably mates with pivotal screw 62. The adjustable plate 14 pivots around pivotal shaft 61 to permit outward and inward movement of the platforms 11, 12. In addition, screws 44, 46 extend through openings 42, 43 respectively and suitably mate with threaded openings 36, 24 respectively. Openings 42, 43 work in tandem with opening 41 to allow inward and outward movement of the platforms 11, 12.

Lastly, the underlying frame 17 and cushion portion 18 of the right platform 11 extend over the blade 19 to provide the appropriate support to the rider. The left platform 12 is assembled in precisely the same manner.

The rider may choose a variety of base widths by simply changing the position of hand knob 39, which is integral with the adjustable plate 14. Moving the hand knob 39 to the far left, as viewed from the rear in FIG. 4, aligns the platforms 11, 12 side by side. FIG. 2 illustrates this closed position. On the other side of the spectrum, moving the hand knob 39 to the far right adjusts the platforms 11, 12 to the extreme outward position with respect to each other. FIG. 3 illustrates this open position.

FIGS. 1 through 4 illustrate a particular embodiment of the present invention, and various modifications may be made without departing from the broader scope of the present invention.

One may readily notice that the present invention provides a convenient, efficient adjustable seat, which best accommodates a rider in today's fast paced world. The invention embodies a unique adjustment means which allows the rider to adjust his/her seat to the desired position with a simple shift of a knob.

Although the present invention has been described with reference to a preferred embodiment, workers skilled in the art will recognize that changes may be made in form and detail without departing from the spirit and scope of the invention.

What is claimed is:

1. An adjustable bicycle seat, comprising:
    a base integral with a lower horn portion;
    a first support platform positioned above and supported by the base for support of a rider's right buttock;
    a second support platform positioned above and supported by the base and positioned adjacent to the first rider support platform for support of a rider's left buttock; and
    means for symmetrically moving the first support platform and second support platform with respect to the base; wherein the means for symmetrically moving said support platforms comprises:
        a pivotable adjustment plate positioned between the base and platforms wherein pivoting of the adjustment plate symmetrically moves said support platforms in any of rider selected positions.

2. The adjustable bicycle seat of claim 1 wherein the means for symmetrically moving said support platforms further comprises:
    at least two elongated openings defined by the adjustment plate; and
    at least two screws engaged with said support platforms;
    wherein said screws are received within respective elongated openings such that rotation of the adjustment plate symmetrically moves the support platforms in any of rider selected angular positions.

3. The adjustable bicycle seat of claim 2 wherein the elongated openings are arc shaped.

4. The adjustable bicycle seat of claim 1 wherein the lower horn portion comprises a horn shaft, wherein the first support platform and the second support platform are attached to the base at said horn shaft, and wherein said support platforms symmetrically move by pivoting about said horn shaft.

5. The adjustable bicycle seat of claim 4 wherein said base has a longitudinal axis, wherein said support platforms can rotate between approximately 4 and 18 degrees away from said longitudinal axis.

6. The adjustable bicycle seat of claim 5 wherein said rotation of said support platforms is cause by an approximately 50 degree rotation of said adjustment plate.

7. The adjustable bicycle seat of claim 1 wherein the means for symmetrically moving said support platforms further comprises:
    at least one pivotal opening defined by the adjustment plate; and at least one pivotal shaft received within the pivotal opening such that the adjustment plate can rotate about the pivotal shaft.

8. The adjustable bicycle seat of claim 7 wherein said base has a longitudinal axis, wherein said adjustment plate can rotate between approximately 25 degrees to the left and approximately 25 degrees to the right of said longitudinal axis.

9. The adjustable bicycle seat of claim 1 wherein the adjustment plate comprises a hand knob to allow grasping of the adjustment plate thereby allowing manual movement of said rider support platforms.

10. The adjustable bicycle seat of claim 9 wherein said hand knob extends beyond the first support platform and the second support platform so as to be accessible to a rider.

11. The adjustable bicycle seat of claim 1 wherein the adjustment plate is a metal plate.

12. The adjustable bicycle seat of claim 1 wherein said support platforms comprise at least one underlying frame which supports a cushion.

13. The adjustable bicycle seat of claim 12 wherein the cushion comprises a gel-like padding.

14. The adjustable bicycle seat of claim 1 further comprising an attachable upper horn portion secured in relation to the lower horn portion.

15. The adjustable bicycle seat of claim 1 wherein the rider selected angular positions between the two rider support platforms range from approximately 4.0 degrees to 18.0 degrees.

16. An adjustable bicycle seat comprising:
a base;
a first support platform positioned above and supported by the base for support of a rider's right buttock;
a second support platform positioned above and supported by the base and positioned adjacent to the first rider support platform for support of a rider's left buttock; and
a pivotable adjustment plate positioned between the base and support platforms for outward and inward movement of said support platforms with respect to each other.

17. The adjustable bicycle seat of claim 16 further comprising:
at least two elongated openings defined by the adjustment plate; and
at least two screws engaged with said support platforms and received within respective elongated openings such that rotation of the adjustment plate moves said screws within said respective elongated opening the support platforms in any of rider selected angular positions.

18. The adjustable bicycle seat of claim 17 wherein the rider selected angular positions between the two rider support platforms range from approximately 4.0 degrees to 18.0 degrees.

19. The adjustable bicycle seat of claim 17 wherein the elongated openings are arc shaped.

20. The adjustable bicycle seat of claim 16 wherein the base comprises a horn shaft, wherein the first support platform and the second support platform are attached to the base at said horn shaft, and
wherein said support platforms move inward and outward by pivoting about said horn shaft.

21. The adjustable bicycle seat of claim 20 wherein said base has a longitudinal axis, wherein said support platforms can rotate between approximately 4 and 18 degrees away from said longitudinal axis.

22. The adjustable bicycle seat of claim 1 wherein said rotation of said support platforms is cause by an approximately 50 degree rotation of said adjustment plate.

23. The adjustable bicycle seat of claim 16 further comprising:
a pivotal opening defined by the adjustment plate; and
a pivotal shaft received within the pivotal opening such that the adjustment plate can rotate about the pivotal shaft.

24. The adjustable bicycle seat of claim 23 wherein said base has a longitudinal axis, wherein said adjustment plate can rotate between approximately 25 degrees to the left and approximately 25 degrees to the right of said longitudinal axis.

25. The adjustable bicycle seat of claim 16 wherein the adjustment plate is a metal plate.

26. The adjustable bicycle seat of claim 16 wherein the adjustment plate comprises a hand knob to allow grasping of the adjustment plate thereby allowing manual movement of said rider support platforms.

27. The adjustable bicycle seat of claim 26 wherein said hand knob extends beyond the first support platform and the second support platform so as to be accessible to a rider.

28. The adjustable bicycle seat of claim 16 wherein said support platforms comprise at least one underlying frame which supports a cushion.

29. The adjustable bicycle seat of claim 28 wherein the cushion comprises a gel-like padding.

30. The adjustable bicycle seat of claim 16 further comprising an attachable upper horn portion secured in relation to the lower horn portion.

31. An adjustable bicycle seat comprising: a base;
a first support platform positioned above and supported by the base for support of a rider's right buttock;
a second support platform positioned above and supported by the base and positioned adjacent to the first rider support platform for support of a rider's left buttock; and
a hand manipulated adjustment plate positioned between the base and support platforms for outward and inward movement of said support platforms with respect to each other.

32. The adjustable bicycle seat of claim 31 wherein said adjustment plate provides a mechanical advantage to reduce the force on the adjustment plate necessary for outward and inward movement of said support platforms with respect to each other.

33. The adjustable bicycle seat of claim 32 wherein said adjustment plate may be hand manipulated by a rider while being seated on the adjustable bicycle seat.

* * * * *

UNITED STATES PATENT AND TRADEMARK OFFICE
CERTIFICATE OF CORRECTION

PATENT NO. : 5,352,016

DATED : October 4, 1994

INVENTOR(S) : Richard S. Hobson

It is certified that error appears in the above-indentified patent and that said Letters Patent is hereby corrected as shown below:

Column 5, line 55, "opening" be --openings--.

Signed and Sealed this

Thirtieth Day of May, 1995

*Attest:*

BRUCE LEHMAN

*Attesting Officer*  *Commissioner of Patents and Trademarks*